(12) United States Patent
Kitahara et al.

(10) Patent No.: US 12,547,460 B2
(45) Date of Patent: Feb. 10, 2026

(54) NODE LEVEL CONTAINER MUTATION DETECTION

(71) Applicant: International Business Machines Corporation, Armonk, NY (US)

(72) Inventors: Hirokuni Kitahara, Sumida-ku (JP); Yuji Watanabe, Chuouku (JP); Kugamoorthy Gajananan, Toshima-ku (JP); Ruriko Kudo, Saitama (JP)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 17/933,865

(22) Filed: Sep. 21, 2022

(65) Prior Publication Data

US 2024/0095075 A1    Mar. 21, 2024

(51) Int. Cl.
*G06F 9/50*     (2006.01)
*G06F 21/55*    (2013.01)

(52) U.S. Cl.
CPC .......... *G06F 9/5027* (2013.01); *G06F 21/554* (2013.01)

(58) Field of Classification Search
CPC ............................ G06F 9/5027; G06F 21/554
See application file for complete search history.

(56) References Cited

U.S. PATENT DOCUMENTS

| | | | | |
|---|---|---|---|---|
| 7,472,420 B1* | 12/2008 | Pavlyushchik | ......... | G06F 21/56 713/188 |
| 10,146,936 B1* | 12/2018 | Khanduja | ........... | G06F 9/45558 |
| 2017/0098072 A1 | 4/2017 | Stopel | | |
| 2019/0286820 A1* | 9/2019 | Yoon | ..................... | G06F 21/566 |
| 2020/0193016 A1 | 6/2020 | Zeng | | |
| 2021/0089420 A1* | 3/2021 | Kitahara | ............. | G06F 11/3006 |
| 2021/0089631 A1 | 3/2021 | Kitahara | | |

OTHER PUBLICATIONS

Gantikow et al., "Rule-based Security Monitoring of Containerized Workloads", In Proceedings of the 9th International Conference on Cloud Computing and Services Science (CLOSER 2019), pp. 543-550, DOI: 10.5220/0007770005430550 (Year: 2019).*

(Continued)

*Primary Examiner* — Bradley A Teets
(74) *Attorney, Agent, or Firm* — Aaron N. Pontikos (57) ABSTRACT

A computer-implemented method for determining container information associated with detected container mutation events is disclosed. The computer-implemented method includes: determining that a system call event to a host operating system includes a call to join a namespace and execute a parent process inside the namespace; determining that the namespace is associated with an existing container; responsive to determining that the namespace is associated with an existing container, determining that the system call event further includes a call to execute a child process inside the namespace; and responsive to determining that the system call event further includes a call to execute a child process inside the namespace: designating the child process as a mutation event to the existing container, and determining container information associated with the mutation event to the existing container. A corresponding computer system and computer program product are also disclosed.

17 Claims, 4 Drawing Sheets

(56) References Cited

OTHER PUBLICATIONS

"Kubernetes Security monitoring at scale with Sysdig Falco", Skyscanner Engineering, Jan. 29, 2020, 11 pages, <https://medium.com/@SkyscannerEng/kubernetes-security-monitoring-at-scale-with-sysdig-falco-a60cfdb0f67a>.
Gantikow et al., "Rule-based Security Monitoring of Containerized Workloads", In Proceedings of the 9th International Conference on Cloud Computing and Services Science (CLOSER 2019), pp. 543-550, DOI: 10.5220/0007770005430550, <https://pearl.plymouth.ac.uk/handle/10026.1/15847>.
Kitahara et al., "Real-time Container Integrity Monitoring for Large-Scale Kubernetes Cluster", Journal of Information Processing vol. 29 505-514 (Sep. 2021), DOI: 10.2197/ipsjjip.29.505, <https://www.jstage.jst.go.jp/article/ipsjjip/29/0/29_505/_article>.

* cited by examiner

```
{
  "output": "05:20:38.541839837: Error setns event (user=root container=<NA>
roc/3321/ns/pid) nstype64(CLONE_NEWPID) )",
  "priority": "Error",
  "rule": "The setns event",
  "time": "2021-07-06105:20:38.541839837Z",
  output_fields": {
    "container.id": null,
    "container.name": null,
    "evt.args": "rd.6(<f>/proc/3321/ns/pid) nstype=64(CLONE_NEWPID)
    "evt.time": 1625548838541840000,
    "k8s.pod.name": null,
    "proc.cmdline": "nsenter --target 3321 -n -m -u -i -p -- bash",
    "proc.pid": 3377231,
    "proc.pname": "bash",
    "proc.ppid": 3351403,
    "user.name": "root"
  }
}
```

```
root@minikube:/# cat /proc/3321/cgroup | head -n 1 | cut -d/ -f6,7
podfdc2ea6d-fd4a-455c-b1cd-7ab33d707531/110a0cbd5fe9013463281d8a1d432e814f03cb0b60cdd2029d73ad600123a314
```

NODE LEVEL CONTAINER MUTATION DETECTION

BACKGROUND

The present invention relates generally to the field of containerization, and more particularly to detecting mutation events within containers.

Containerization is the packaging of software code together with the related configuration files, operating system (OS) libraries, and dependencies required to run the code in a single standalone, executable package of software known as a container. By bundling the application code together with the related configuration files, libraries, and dependencies required to run the application in a single container, the container is abstracted away from the host operating system, thereby becoming portable and able to run across any platform or cloud.

Containers are often referred to as "lightweight," meaning they share the machine's operating system kernel and do not require the overhead of associating an operating system within each application. More portable and resource-efficient than virtual machines (VMs), containers are inherently smaller in capacity than a VM and require less start-up time, allowing far more containers to run on the same compute capacity as a single VM.

SUMMARY

According to one embodiment of the present invention, a computer-implemented method for determining container information associated with detected container mutation events is disclosed. The computer-implemented method includes determining that a system call event to a host operating system includes a call to join a namespace and execute a parent process inside the namespace. The computer-implemented method further includes determining that the namespace is associated with an existing container. The computer-implemented method further includes, responsive to determining that the namespace is associated with an existing container, determining that the system call event further includes a call to execute a child process inside the namespace. The computer-implemented method further includes, responsive to determining that the system call event further includes a call to execute a child process inside the namespace: designating the child process as a mutation event to the existing container, and determining container information associated with the mutation event to the existing container.

According to another embodiment of the present invention, a computer program product for determining container information associated with detected container mutation events is disclosed. The computer program product includes one or more computer readable storage media and program instructions stored on the one or more computer readable storage media. The program instructions include instructions to determine that a system call event to a host operating system includes a call to join a namespace and execute a parent process inside the namespace. The program instructions further include instructions to determine that the namespace is associated with an existing container. The program instructions further include, responsive to determining that the namespace is associated with an existing container, instructions to determine that the system call event further includes a call to execute a child process inside the namespace. The program instructions further include, responsive to determining that the system call event further includes a call to execute a child process inside the namespace, instructions to designate the child process as a mutation event to the existing container, and determine container information associated with the mutation event to the existing container.

According to another embodiment of the present invention, a computer system for determining container information associated with detected container mutation events is disclosed. The computer system includes one or more computer processors, one or more computer readable storage media, and program instructions stored on the computer readable storage media for execution by at least one of the one or more processors. The program instructions include instructions to determine that a system call event to a host operating system includes a call to join a namespace and execute a parent process inside the namespace. The program instructions further include instructions to determine that the namespace is associated with an existing container. The program instructions further include, responsive to determining that the namespace is associated with an existing container, instructions to determine that the system call event further includes a call to execute a child process inside the namespace. The program instructions further include, responsive to determining that the system call event further includes a call to execute a child process inside the namespace, instructions to designate the child process as a mutation event to the existing container, and determine container information associated with the mutation event to the existing container.

DETAILED DESCRIPTION

There are two primary types of containers: (i) operating system (OS) containers and (ii) application containers (also referred to as "containerized applications"). OS containers are virtual environments that share the kernel of the host operating system, but provide user space isolation. Like a physical OS, OS containers allow for installing, configuring, and running different applications and libraries. Similarly, like a virtual machine (VM), any applications running inside a container can only utilize resources that have been assigned to that container. OS containers are useful for distributing and running a plurality of identical or different OS packages, e.g., Linux-based operating system packages. Generally, OS containers are created from templates that determine the structure and contents of the container. This allows for creating containers that have identical environments with the same package versions and configurations across all containers.

Whereas OS containers are designed to run multiple processes and services, application containers are designed to package and run a single service. For example, Docker is an open-source project that automates the deployment of applications inside software containers by providing an additional layer of abstraction and automation of operating-system-level virtualization on Linux. Docker uses resource isolation features of the Linux kernel such as cgroups and kernel namespaces to allow independent "containers" to run within a single Linux instance, avoiding the overhead of starting and maintaining virtual machines. The term(s) "Docker" and "Linux" may be subject to trademark rights in various jurisdictions throughout the world and are used here only in reference to the products or services properly denominated by the marks to the extent that such trademark rights may exist.

Containerized applications are "isolated" in that they do not bundle in a copy of the operating system. Instead, an open source runtime engine or container engine (such as the Docker runtime engine) is installed on the host's operating system and becomes the conduit for containers to share an operating system with other containers on the same computing system. Other container layers, like common bins and libraries, can also be shared among multiple containers. The isolation of applications as containers also reduces the chance that malicious code present in one container will impact other containers or invade the host system.

Although isolating applications as containers reduces the impact of malicious code in one container from impacting other containers, all containerized applications remain susceptible to mutation events, which may or may not be malicious. A "mutation event" as used herein shall mean a file change (i.e., change to the software packaged in a running container) and/or a process execution event (i.e., the addition to or replacement of a current process in a running container) made via an external operation. Current system monitoring tools can detect mutation events to containers triggered by external application programming interface (API) requests or calls made via an application specific command line interface (CLI), such as "Docker CLI" for running commands against Docker containers and "kubectl" for running commands against a Kubernetes cluster. The term "Kubernetes" may be subject to trademark rights in various jurisdictions throughout the world and are used here only in reference to the products or services properly denominated by the marks to the extent that such trademark rights may exist.

External API requests to run commands against Docker containers or Kubernetes clusters made via an application specific CLI, such as Docker CLI or kubectl automatically result in the assignment of cgroups to newly executed processes by a runtime engine. Embodiments of the present invention recognize that current system monitoring tools rely on the assignment of cgroups to newly executed processes in order to determine that the process is being executed in a running container, and thus should be treated as a mutation event. However, there exist other means outside of Docker CLI or kubectl for executing processes in a container that does not result in the assignment of cgroups.

Embodiments of the present invention recognize that one way to avoid detection of mutation events in containers by current system monitoring tools is to bypass the runtime engine and communicate with the host machine OS directly through an external system call (syscall). For example, the "setns" system call allows the calling process to join an existing process namespace. More specifically, the "setns" system call dissociates the calling process from one instance of a particular namespace and reassociates the process with another instance of the same namespace type. Coupling an "setns" system call with an "exec" function further allows the calling process to join an existing namespace and execute a particular command in that namespace. For example, an "setns" system call that includes an "execve" command will replace the calling process image with a new process image in the specified existing namespace. As another example, a system call that includes an "nsenter" command allows the calling process to enter the namespaces of one or more other processes and then execute the specified program in the existing namespace.

By conducting external operations via system calls to the host machine OS to execute a process in an existing namespace (e.g., an existing process namespace), mutation events to containers remain undetectable by current system monitoring tools since the host machine OS does not assign cgroups to processes executed in an existing process namespace. Thus, although current system monitoring tools may be able to detect external system calls to the host machine OS to execute processes, without the assignment of cgroups by the runtime engine, current system monitoring tools are unable to determine whether a process is created inside of an existing container, or the particular existing container that the process is running within. This lack of container specific information is a critical problem for detecting mutation events in existing containers.

Embodiments of the present invention improve upon the above mentioned deficiencies of current system monitoring tools by providing for a method, computer program product, and system for detecting container mutation events resulting from external system calls to a host machine OS and determining container information (e.g., container ID and/or container name) of the particular container associated with the container mutation event. This is particularly advantageous in that should a container mutation event be found to be malicious, appropriate corrective actions can be performed with respect to the affected container.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" and "dynamically" mean without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" each refer to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Figure 1:
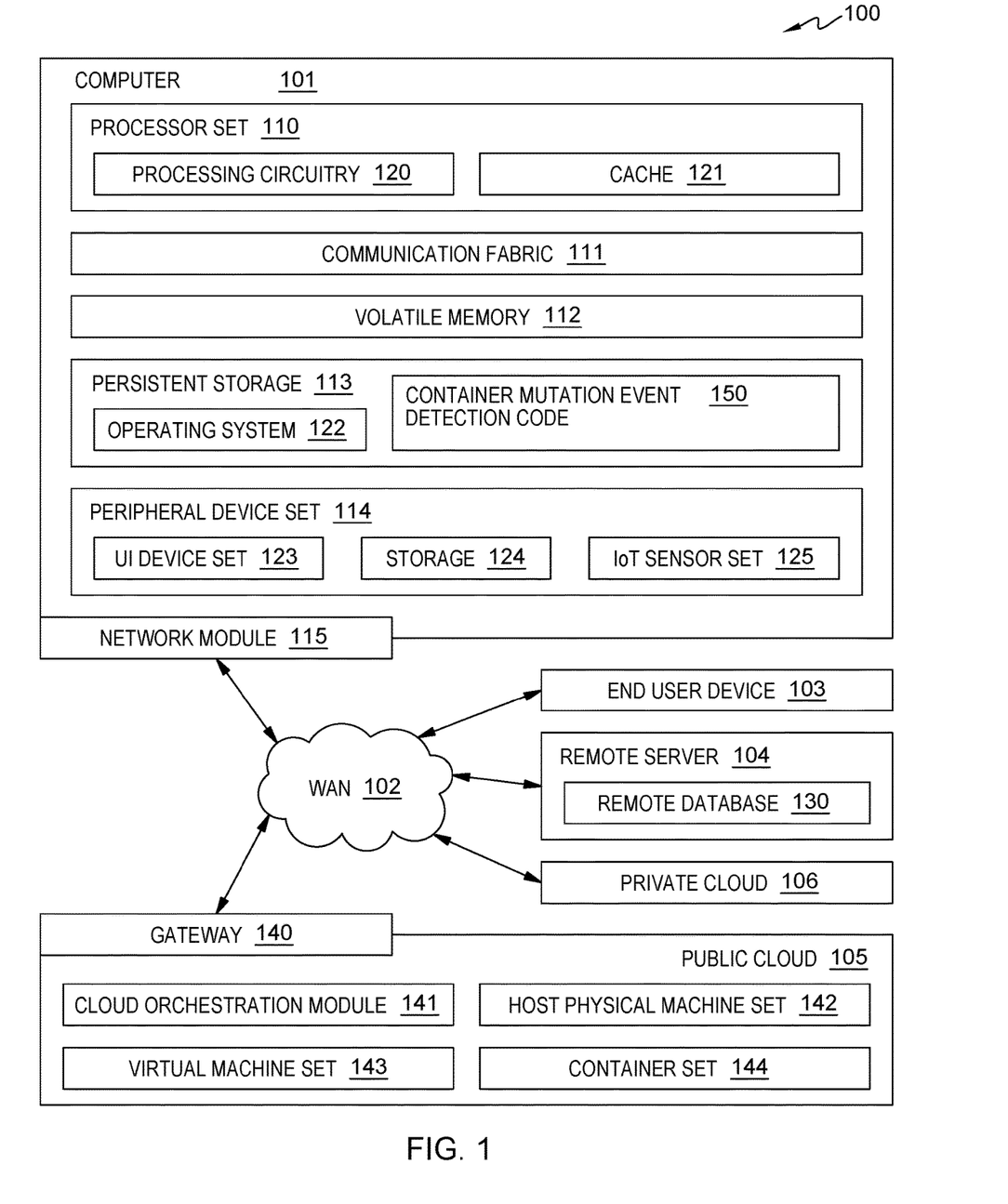
FIG. 1 is a functional block diagram of a computing environment, generally designated 100, suitable for the execution of at least some of the computer code involved in performing the inventive methods, such as container mutation event detection code 150, in accordance with at least one embodiment of the invention.

The present invention will now be described in detail with reference to the Figures. FIG. 1 is a functional block diagram of a computing environment, generally designated 100, suitable for the execution of at least some of the computer code involved in performing the inventive methods, such as container mutation event detection code 150, in accordance with at least one embodiment of the invention. FIG. 1 provides only an illustration of one implementation and does not imply any limitations with regard to the environments in which different embodiments may be implemented. Many modifications to the depicted environment may be made by those of ordinary skill in the art without departing from the scope of the invention as recited by the claims.

In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

EUD 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
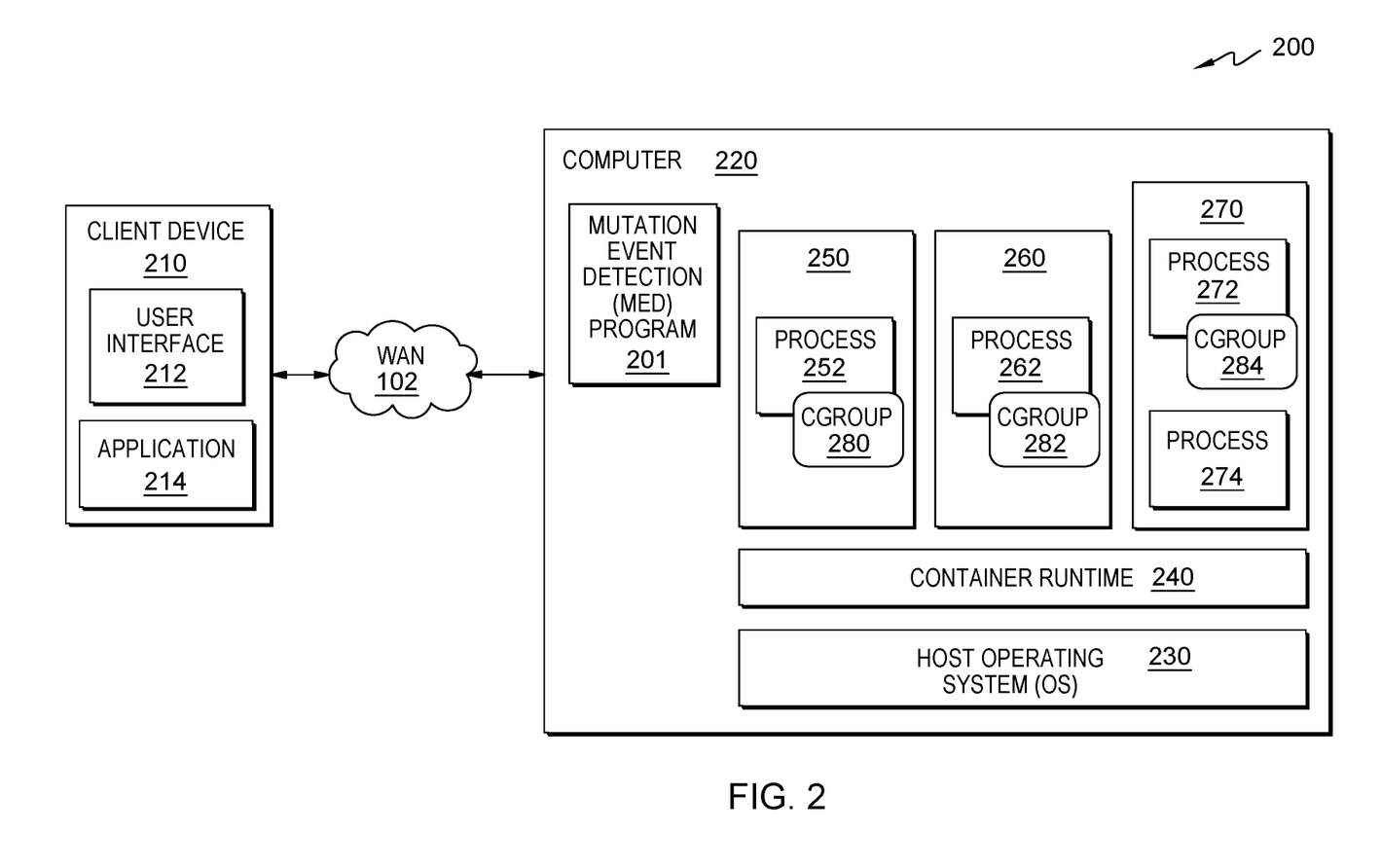
FIG. 2 is a functional block diagram of an exemplary container mutation event detection system, generally designated 200, suitable for operation of a container monitoring program 201, in accordance with at least one embodiment of the invention.

FIG. 2 is a functional block diagram of an exemplary container mutation event detection system, generally designated 200, suitable for operation of a container monitoring program 201, in accordance with at least one embodiment of the invention. Container mutation event detection system 200 may be implemented in a computing environment, such as computing environment 100, as described with reference to FIG. 1. FIG. 2 provides only an illustration of one implementation and does not imply any limitations with regard to the environments in which different embodiments may be implemented. Many modifications to the depicted environment may be made by those of ordinary skill in the art without departing from the scope of the invention as recited by the claims.

Container mutation event detection system 200 includes client device 210 and computer 220 interconnected over WAN 102. In general, client device 210 can represent any programmable electronic device or combination of programmable electronic devices capable of executing machine readable program instructions and communicating with computer 220, and other devices (not depicted) via a network, such as WAN 102. In an embodiment, client device 210 is an end user device, such as EUD 103 depicted in FIG. 1, and can be a mobile device, laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art.

User interface 212 is program that provides an interface between a user of an end user device, such as client device 210, and one or more applications running on computer device 220. A user interface, such as user interface 212, refers to the information (such as graphic, text, and sound) that a program presents to a user, and the control sequences the user employs to control the program. A variety of types of user interfaces exist. In an embodiment, user interface 212 is a graphical user interface used to interact with one or more applications, such as application 214 operational on client device 210. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements.

In an embodiment, user interface 212 is a script or application programming interface (API) used to interact with runtime engine 240 operational on computer 220. In an embodiment, user interface 212 is used to execute commands (e.g., changes to files or running new processes) in a running container, such as containers 250-270. In an embodiment, user interface 212 can be a Docker or Kubernetes specific command line interface (CLI), such as the Docker CLI for interacting with containers 250-270, and the Kubernetes CLI (kubectl) for interacting with a cluster of running containers (not depicted). For example, a user may interact with a Docker container by issuing the following command via the Docker CLI: "docker exec-<container><command>." As another example, a user may interact with a cluster of Docker containers by issuing the following command via the Kubernetes CLI: "kubectl exec-<cluster><command>."

In general, computer 220 represents any programmable electronic device or combination of programmable electronic devices capable of executing machine readable program instructions and communicating with each other, as well as with client device 210 and other computing devices (not shown) within via a network, such as WAN 102. In an embodiment, computer 220 is a standalone device, such as computer 101, that is capable of running a program and accessing a network or querying a database. In an embodiment, computer 220 can be a management server, a web server, an application server, a mobile device, or any other electronic device or computing system capable of receiving, sending, and processing data. In an embodiment, computer 220 represents a server computing system utilizing multiple computers as a server system. In an embodiment, computer 220 represents a computing system utilizing clustered computers and components (e.g., application server computer, web server computer, webmail server computer, media server computer, etc.) that act as a single pool of seamless resources.

Computer 220 includes host operating system (OS) 230, container runtime 240, and containers 250-270. Host OS 230 is software installed on computer 220 that interacts with the underlying hardware of computer 220. Host OS 230 may be representative of operating system 122 installed on computer 101 depicted in FIG. 1.

In general, container runtime 240 (also known as a container engine) is a runtime engine installed on computer 220 that functions to deploy, build, run, and manage containers. In an embodiment, container runtime 240 is a Docker engine and containers 250-270 are Docker containers. While reference is made to Docker and/or Docker-specific elements, it should be understood that aspects of the present invention may be applied equally to other automated programs for building, deploying, and running containers. For example, container runtime 240 may be any generally known container runtimes or automated processes for practicing container deployment, including, but not limited to runC, containerd, and Windows Containers, and may be a low-level container runtime, high-level container runtime, and/or sandboxed or virtualized container runtime. In an embodiment, container runtime 240 performs operations including, but not limited to, loading container images from a repository, monitoring local system resources, isolating system resources for use of a container, and managing container lifecycles.

In some embodiments, container mutation event detection system 200 further includes a container orchestration platform (not shown), such as, for example, Kubernetes. A container orchestration platform encapsulates multiple containers, storage resources, and options that govern how the containers within a cluster (i.e., group of containers) should run. Thus, containers included in the same cluster share the same resources and act as a single manageable entity (i.e., multiple containers within the same cluster are logically grouped). While reference is made to Kubernetes and/or Kubernetes-specific elements, it should be understood that aspects of the present invention may be applied equally to other automated programs for deploying, scaling, and operating application containers.

Container runtime 240 builds containers, such as containers 250-270, based on container templates. Generally speaking, a container template includes the information necessary to deploy, build, and run a container as a single service. In various embodiments, container runtime 240 creates a new container from a base image (comprised of one or more immutable layers) and a container layer, which hosts all changes (e.g., newly written files, modifications to files, and deletions to files) made to a container deployed and running on computer 220. Thus, whereas multiple containers can share the same underlying base image, the container layer allows different containers formed from the same base image to maintain individual records of its own data state (i.e., state information). In some embodiments, containers 250-270 collectively include the runtime components, such as files, environment variables, and libraries necessary to run an application as a single service. In other embodiments, each of containers 250-270 separately include the runtime components, such as files, environment variables, and libraries necessary to run separate applications as single services.

At their core, containers 250-270 are operating system processes that share the host OS kernel, but with restrictions on the particular files and resources they can consume and have access to. In some embodiments, runtime engine 240 attaches or otherwise assigns control groups (cgroups) to containers (and the processes running therein) on computer 220. For example, a set of processes running in a container are all assigned to the same cgroup, and therefore, the cgroup is attached to the container, whereby each process in the set of processes running in the container are bound by the same resource constraints. A cgroup is a feature of the Linux kernel that limits, accounts for, and isolates the system resource usage (e.g., CPU, RAM, input/output operations per second (IOPS), and network) of processes running in a container. In an embodiment, a cgroup limits an application to a specific set of resources that allows container runtime 240 to share available hardware resources to containers and optionally enforce limits and constraints. In an embodiment, a cgroup can provide for, but is not limited to, one or more of the following features: (i) resource limits (limit how much a particular resource a process can use), (ii) prioritization (control how much of a resource a process can use compared to processes in another cgroup), (iii) accounting (monitoring and reporting of resource limits at the cgroup level), and (iv) control (change process status (frozen, stopped, or restarted) of all processes in a cgroup).

In some embodiments, container runtime 240 attaches a cgroup to a new process added to a running container when a process execution command(s) is made via a API request to container runtime 240 using a container specific CLI tool, such as the Docker CLI for docker containers or kubectl for Kubernetes clusters. In some embodiments, container runtime 240 attaches a cgroup to a new process added to a running container during the process creation. In an embodiment, the particular cgroup that a process running in a container is attached to is predetermined. For example, a system administrator with sufficient privileges can create, modify, and remove the particular processes assigned to different cgroups using basic shell commands or a libc-group-tools package. Further, the system administrator can assign a process or group of processes to a particular cgroup by mapping a process identification (PID) namespace associated with a process to a cgroup file in a cgroup file directory. In this instance, if a new process command is issued via an API request to container runtime 240 using a container specific CLI, and the process has already been assigned to a cgroup, container runtime 240 automatically attaches the assigned cgroup to the new process added to a running container. In an embodiment, the particular cgroup that a process running in a container is attached to is not predetermined. For example, a system administrator may not have assigned a process or group of processes to a particular cgroup. In this instance, if a new process command is issued via an API request to container runtime 240 using a container specific CLI, and the process has not been previously assigned to a cgroup, container runtime 240 automatically attaches the process to the root cgroup of the cgroup file directory.

As depicted in FIG. 2, cgroup 280 is attached to process 252 running in container 250, cgroup 282 is attached to process 262 running in container 260, and cgroup 284 is attached to process 272 running in container 270. Since cgroups have been attached to processes 252, 262, and 272 running in containers 250-270, respectively, it can be assumed that these processes were created via an API request to container runtime 240 using an application specific CLI tool, such as Docker CLI or kubectl. This stems from the fact that when process commands are communicated directly from a client API request to container runtime 240, container runtime 240 automatically attaches a cgroup to the newly added process. On the other hand, since a cgroup is not attached to process 274 running in container 270, it can be assumed that this process was created via an external system call to host OS 230.

In some embodiments, a command may be executed in a running container via an API request communicated from client device 210 to container runtime 240 operating on computer 220. In an embodiment, in order to execute commands on running containers using an API request, the container name or container ID and the command to be executed are required. For example, to execute a command in a running Docker container, the following Docker API request may be entered via the Docker CLI: "docker exec<container ID><command>." In an embodiment, in order to execute commands on one or more running containers within a cluster, the cluster ID, container name(s) running within the cluster, and the command to be executed are required. For example, to execute a command to one or more containers running in a Kubernetes cluster, the following Kubernetes API request may be entered via the Kubernetes CLI: "kubectl exec<cluster ID><container ID(s)><command>." It should be noted that since the container ID(s) is required for API requests made to container engine 240, the particular container to which the command is directed to can be identified from the API request. Thus, if the command results in a mutation event associated with a running container, the particular container associated with the mutation event is identifiable from the API request alone.

In some embodiments, a command may be executed in a running container via an external system call (syscall) communicated from client device 210 to host OS 230 of computer 220. As used herein, a system call shall mean the programmatic way in which a computer program requests a service from the kernel of the operating system on which it is executed. In an embodiment, a command may be executed in one or more running containers by joining an existing process ID (PID) namespace. PID namespaces provide isolation between the processes within different namespaces by limiting which processes within a container(s) are visible to one another. PID namespaces isolate the process ID number space, such that processes in different PID namespaces can have the same PID. The first process created in a namespace has PID 1 and child processes are assigned subsequent PIDs. If a child process is created with its own PID namespace, it has PID 2 in that namespace as well as the PID of the parent process' namespace (PID1).

In an embodiment, to execute a command in a container namespace, a setns system call coupled with any of the execution functions (e.g., exec, execve, execvp, etc.) can be used to join the specified namespace and execute the specified command in that namespace. For example, to execute a command in a container namespace via host OS 230, the following system call may be entered: "setns<PID namespace>exec<command>." In an embodiment, to execute a command in a container namespace, a nsenter command can be used to enter the specified namespace and then execute the specified command within the namespace. For example, to execute a command in a container namespace via host OS 230, the following system call may be entered: "nsenter<PID namespace><command>."

Computer 220 further includes mutation event detection (MED) program 201. MED program 201 may be representative of computer code involved in performing the inventive methods, such as container mutation event detection code 150 stored in persistent storage 113 in FIG. 1. In an embodiment, MED program 201 operates on computer 220, and can be utilized by one or more client devices, such as client device 210, via an application download from computer 220 or a third-party application stored and executed on client device 210. In an embodiment, MED program 201 may be software, downloaded from computer 220, and installed on one or more client devices, such as client device 210. In an embodiment, MED program 201 may be utilized as a software service provided by a third-party cloud service provider (not shown). In an embodiment, MED program 201 may include one or more components (not shown), such as add-ons, plug-ins, and agent programs, etc., installed on one or more client devices, such as client device 210, to detect container mutation events and determine the particular containers associated with said container mutation events.

Figure 3:
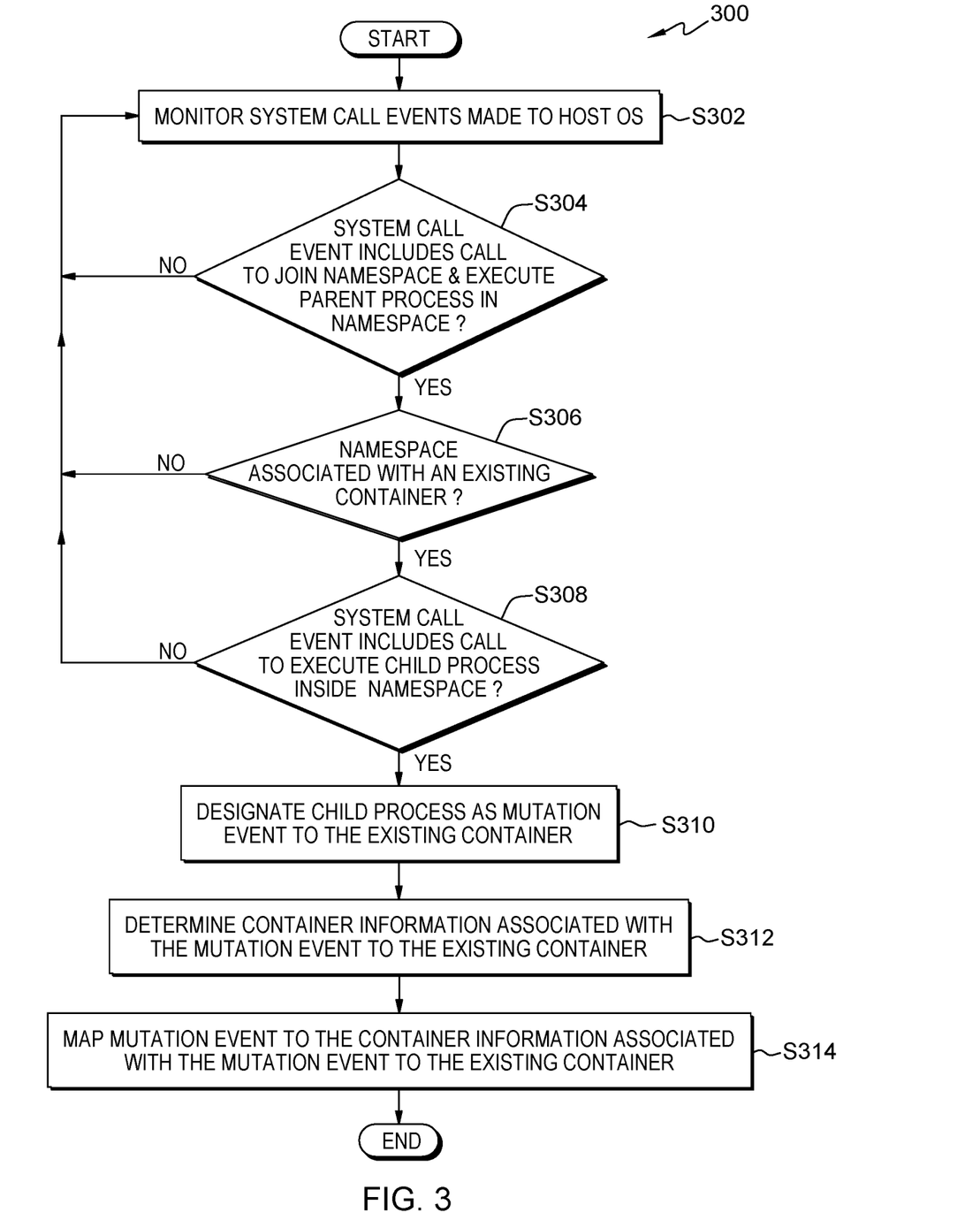
FIG. 3 is a flow chart diagram, generally designated 300, depicting operational steps for detecting container mutations by container mutation detection program 101 in accordance in accordance with at least one embodiment of the invention.

FIG. 3 is a flowchart diagram, generally designated 300, depicting operational steps by MED 201 for detecting container mutation events and determining container information associated with detected container mutation events in accordance with at least one embodiment of the present invention. FIG. 3 provides an illustration of only one implementation and does not imply any limitations with regard to the environments in which different embodiments may be implemented. Many modifications to the depicted environment may be made by those skilled in the art without departing from the scope of the invention as recited by the claims.

At step S302, MED program 201 monitors system call events made to a host OS, such as host OS 230, during a terminal session for potential container mutation events.

At decision step S304, MED program 201 determines whether a system call event includes a call to join an existing namespace and execute a parent process inside the namespace. In an embodiment, the call to join an existing namespace is a call to enter a parent namespace. In an embodiment, the call to join an existing namespace is a call to enter a child namespace. In an embodiment, a system call event includes a call to join an existing namespace if a "setns" system call is detected. In an embodiment, a system call event includes a call to execute a parent process inside a namespace if a "nsenter" command is detected. In an embodiment, a system call event includes a call to enter an existing namespace and execute a parent process inside the namespace if a "setns" system call, followed by an "nsenter" command is detected.

If MED program 201 determines that a system call event does not include a call to join an existing namespace and a command to execute a parent process inside the existing namespace (decision step S304 "NO" branch), MED program 201 returns to step S302 and continues to monitor system calls events made to the host OS for potential container mutation events. If MED program 201 determines that a system call event does include a call to join an existing namespace and a command to execute a parent process inside the existing namespace (decision step S304 "YES" branch), MED program 201 proceeds to step S306.

At decision step S306, in response to determining that the system call event does include a call to join an existing namespace and execute a parent process inside the namespace, MED program 201 determines whether the namespace is associated with an existing container. In an embodiment, MED program 201 determines that the namespace is associated with an existing container based, at least in part, on identifying a process ID (PID) of the namespace specified in the call. In an embodiment, in response to determining that the system call event does include a call to join an existing namespace and execute a parent process inside the existing namespace, MED program 201 further obtains the PID of the parent process executed inside the namespace. For example, the PID namespace of the existing namespace and the PID of the parent process executed inside the existing namespace may be retrieved from the command line interface of a terminal session associated with the system call event. In another example, the PID of the namespace and the PID of the parent process may be obtained from file descriptor information associated with the system call event.

If MED program 201 determines that the namespace is not associated with an existing container (decision step S306 "NO" branch), MED program 201 returns to step S302 and continues to monitor system calls events made to the host OS for potential container mutation events. If MED program 201 determines that the namespace is associated with an existing container (decision step S305 "YES" branch), MED program 201 proceeds to decision step S308.

At decision step S308, in response to determining that the namespace is associated with an existing container, MED program 201 determines whether the system call event further includes a call to execute one or more child processes descending from the parent process inside the namespace. In an embodiment, a child process is detected if a system call to the host OS to execute a process via at least one of the "exec( )" family of functions is made after the system call to join the existing namespace and execute a process. In an embodiment, a child process is detected if a PID of a process executed inside the existing namespace descends from the PID of the parent process. For example, one or more child processes descending from a parent process can be obtained from a process tree by MED 201 entering the following command: "pstree -g". In an embodiment, a child process is detected if a child process includes the PID of the parent process. For example, if a PID of a process is PID3 and the process also belongs to PID1 of another process, MED program 201 may determine that PID1 is the parent process and PID3 is a child process that descends from PID1.

If MED program 201 determines that one or more child processes descending from the parent process have not been executed inside the existing namespace (decision step S308 "NO" branch), MED program 201 returns to step S302 and continues to monitor system calls events made to the host OS for potential container mutation events. If MED program 201 determines that one or more child processes descending from the parent process have been executed inside the existing namespace (decision step S308 "YES" branch), MED program 201 proceeds to step S310.

At step 310, in response to determining that the system call event further includes a call to execute one or more child process descending from the parent process inside the namespace, MED program 201 designates the child process as a mutation event to the existing container. In an embodiment, a designation of the child process as a mutation event to the existing container is based, at least in part, on MED program 201 determining that a PID of the child process descends from the PID of the parent process. In an embodiment, a designation of the child process as a mutation event to the existing container is further based on MED program 201 determining the call to execute the child process inside the namespace is an exec( ) system call.

At step 312, MED program 201 determines container information associated with the mutation event to the existing container. In an embodiment, the determined container information associated with the mutation event to the existing container includes identifying a container ID of the container that the parent process is running inside of. For example, the container ID of the container can be obtained by MED program 201 entering the following command: "cat/proc/<PID namespace>/cgroup", in which data from the cgroup file specified in the command is read and returned as output. In this example, the command "cat/proc/<PID namespace>/cgroup" will return the container ID of the container that the specified PID namespace is assigned to. In an embodiment, the determined container information associated with the mutation event to the existing container includes identifying a container name corresponding to the container ID of the container that the parent process is running inside of. For example, the container name corresponding to the container ID may be obtained via MED program 201 making an API request to a container runtime, such as container runtime 240, about the container name corresponding to the specified container ID.

At step 314, MED program 201 maps the mutation event to the determined container information associated with the existing container. In an embodiment, mapping the determined container information associated with the existing container includes mapping the mutation event to at least one of the container ID or the container name of the existing container.

Figure 4A:
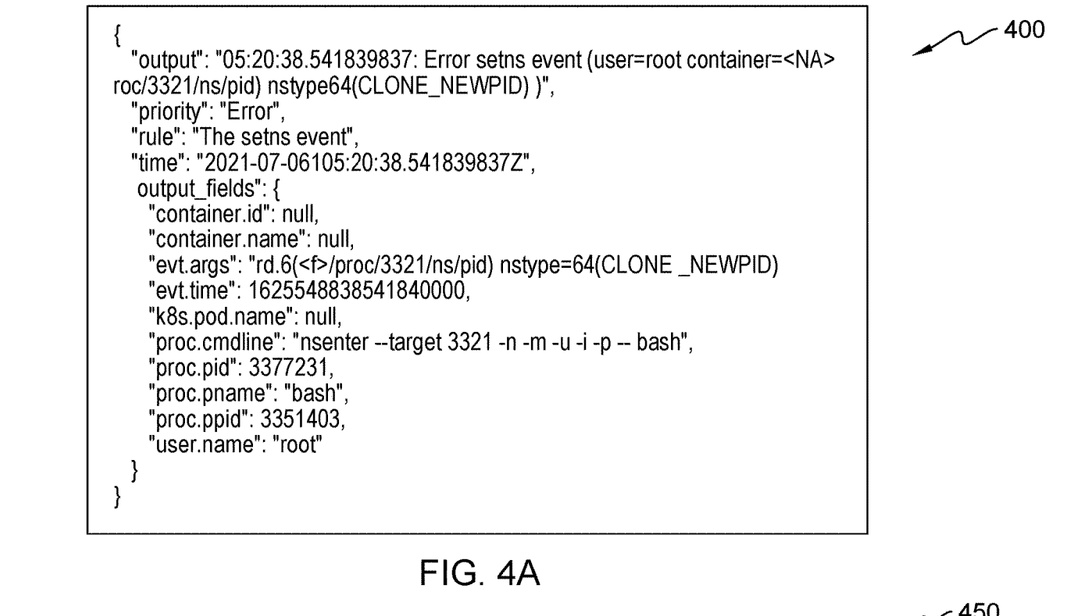
FIG. 4A is an example of an external system call event made to a host operating system, generally designated 400, in accordance with at least one embodiment of the present invention.

FIG. 4A is an example external system call event made to host operating system 230, generally designated 400, in accordance with at least one embodiment of the present invention. As depicted in FIG. 4A, setns system call event 400 includes a setns system call to join a namespace (proc/3321/ns/pid) and an nsenter command to execute the command line interface (CLI) shell program "bash" inside the namespace 3321 (nsenter -target -n -m -u -i -p-bash). Since the command to execute the "bash" program inside the namespace 3321 was made via an setns external system call to host operating system 230, as opposed to runtime engine 240, a cgroup was not attached to "bash" process created in the existing container. Accordingly, the system call event is devoid of any container information associated with the particular container that the "bash" program was executed in. This is evinced by the fact that the "container.id" and "container.name" fields have a "null" value. However, MED program 201 can determine the container ID and container name of the existing container that the "bash" program is running based on identifying the PID namespace corresponding to the existing container from the file descriptor field "evt.args", which in this case is 3321.

Figure 4B:
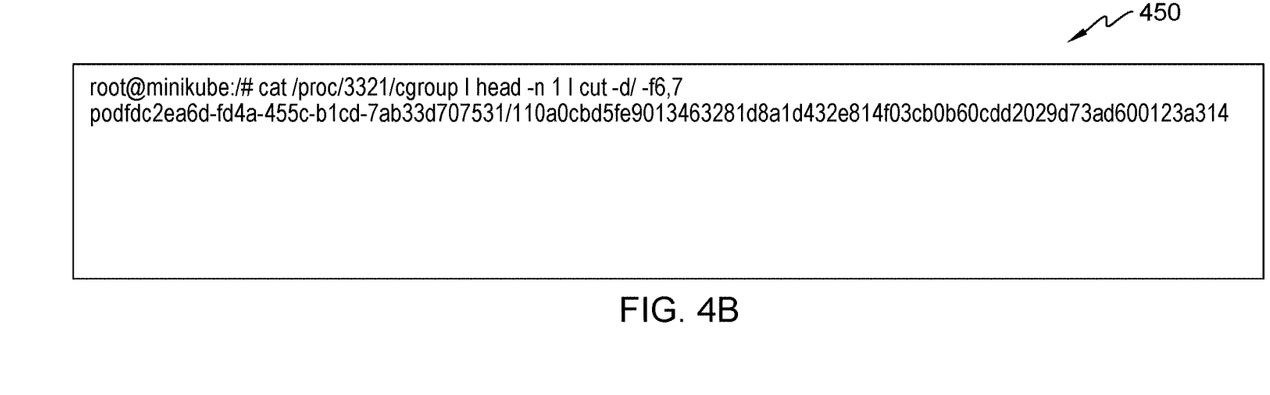
FIG. 4B is an example of an external system call to obtain container information associated with the external system call event 400 in FIG. 4A, generally designated 450, in accordance with at least one embodiment of the present invention.

FIG. 4B is an example of an external system call to obtain container information associated with the external system call event 400 in FIG. 4A, generally designated 450, in accordance with at least one embodiment of the present invention. Specifically, external system call 400 is made by MED program 201 to obtain container information associated with the "bash" program executed in PID namespace 3321 in FIG. 4A. As depicted in FIG. 4B, a pod ID and container ID corresponding to the existing container that the "bash" program is running within is obtained by MED program 201 issuing the command "cat/proc/3321/cgroup", in which data from the cgroup file associated with PID namespace 3321 is read and returned as output. In this example, the command "cat/proc/3321/cgroup" will return the pod ID (podfdc2ea6d-fd4a-455c-b1cd-7ab33d707531 and the container ID (110a0cbd5fe901346328-1d8a1d432e814f03cb0b60cdd2029d73ad6a0123a314) corresponding to the particular existing container that the "bash" program is running within. MED program 201 may further obtain the container name corresponding to the container ID by issuing an API request to container runtime 240 to return the container name corresponding to the previously obtained container ID.

What is claimed is:

1. A computer-implemented method for determining container information associated with detected container mutation events, comprising:
   determining that a system call event to join a process ID (PID) namespace and execute a parent process inside the PID namespace was communicated directly to a host operating system, the determining based on detecting that a control group (cgroup) was not attached to the parent process subsequent to the system call event;
   determining, from file descriptor information associated with the system call event, that the PID namespace that the parent process is executed within is associated with an existing container;
   responsive to determining that the PID namespace is associated with the existing container, determining that the system call event further includes a call to execute a child process inside the PID namespace of the existing container;
   responsive to determining that the system call event further includes a call to execute a child process inside the PID namespace of the existing container, designating the execution of the child process inside the PID namespace of the existing container as a mutation event to the existing container; and
   responsive to determining that the mutation event is malicious, performing
   one or more
corrective actions to the existing container.

2. The computer-implemented method of claim 1, further comprising determining container information associated with the mutation event to the existing container, wherein determining the container information includes:
   identifying at least one of a container ID or a container name of the existing container; and
   mapping the mutation event to the at least one of the container ID and the container name of the existing container.

3. The computer-implemented method of claim 2, wherein the container ID of the existing container is identified based, at least in part, on the PID namespace.

4. The computer-implemented method of claim 1, wherein determining that the system call event to the host operating system includes a call to join a PID namespace and execute a parent process inside the PID namespace is based on identifying at least one of a setns system call or a nsenter command.

5. The computer-implemented method of claim 1, wherein designating the child process as a mutation event to the existing container is further based, at least in part, on determining a PID of the child process descends from a PID of the parent process.

6. The computer-implemented method of claim 5, wherein designating the execution of the child process inside the PID namespace of the existing container as a mutation event to the existing container is further based on determining the call to execute the child process inside the PID namespace of the existing container is an exec( ) system call.

7. A computer program product for determining
   container
information associated with detected container mutation events, the computer
   program product
comprising one or more computer readable storage media and program
   instructions stored on the
one or more computer readable storage media, the program instructions including instructions to:
   determine that a system call event to join a process ID (PID) namespace and execute a parent process inside the PID namespace was communicated directly to a host operating system, the determining based on detecting that a control group (cgroup) was not attached to the parent process subsequent to the system call event;

determine, from file descriptor information associated with the system call event, that the PID namespace that the parent process is executed within is associated with an existing container;

responsive to determining that the PID namespace is associated with the existing container, determine that the system call event further includes a call to execute a child process inside the PID namespace of the existing container;

responsive to determining that the system call event further includes a call to execute a child process inside the PID namespace of the existing container, designate the execution of the child process inside the PID namespace of the existing container as a mutation event to the existing container; and responsive to determining that the mutation event is malicious, perform one or more corrective actions to the existing container.

8. The computer program product of claim 7, further comprising program instructions to determine container information associated with the mutation event to the existing container, wherein the program instructions to determine the container information includes instructions to:

identify at least one of a container ID or a container name of the existing container; and map the mutation event to the at least one of the container ID and the container name of the existing container.

9. The computer program product of claim 8, wherein the container ID of the existing container is identified based, at least in part, on the PID namespace.

10. The computer program product 7, wherein the program instructions to determine that the system call event to the host operating system includes a call to join a PID namespace and execute a parent process inside the PID namespace is based on identifying at least one of a setns system call or a nsenter command.

11. The computer program product of claim 7, wherein the program instructions to designate the child process as a mutation event to the existing container is further based, at least in part, on instructions to determine a PID of the child process descends from a PID of the parent process.

12. The computer program product of claim 11, wherein the program instructions to designate the execution of the child process inside the PID namespace of the existing container as a mutation event to the existing container is further based on determining the call to execute the child process inside the PID namespace of the existing container is an exec( ) system call.

13. A computer system for determining container information
associated with detected container mutation events, comprising:

one or more computer processors;
one or more computer readable storage media; and
program instructions being stored on the one or more computer readable
storage media
for execution by the one or more computer processors, the program instructions
including
instructions to:

determine that a system call event to join a process ID (PID) namespace and execute a parent process inside the PID namespace was communicated directly to a host operating system, the determining based on detecting that a control group (cgroup) was not attached to the parent process subsequent to the system call event;

determine, from file descriptor information associated with the system call event, that the PID namespace that the parent process is executed within is associated with an existing container;

responsive to determining that the PID namespace is associated with the existing container, determine that the system call event further includes a call to execute a child process inside the PID namespace of the existing container;

responsive to determining that the system call event further includes a call to execute a child process inside the PID namespace of the existing container, designate the execution of the child process inside the PID namespace of the existing container as a mutation event to the existing container; and responsive to determining that the mutation event is malicious, perform one or more corrective actions to the existing container.

14. The computer system of claim 13, further comprising program instructions to determine container information associated with the mutation event to the existing container, wherein the program instructions to determine the container information includes instructions to:

identify at least one of a container ID or a container name of the existing container; and map the mutation event to the at least one of the container ID and the container name of the existing container.

15. The computer system of claim 14, wherein the container ID of the existing container is identified based, at least in part, on the PID namespace.

16. The computer system 13, wherein the program instructions to determine that the system call event to the host operating system includes a call to join a PID namespace and execute a parent process inside the PID namespace is based on identifying at least one of a setns system call or a nsenter command.

17. The computer system of claim 13, wherein the instructions to designate the child process as a mutation event to the existing container is further based, at least in part, on instructions to:

determine a PID of the child process descends from a PID of the parent process; and determine the call to execute the child process inside the PID namespace of the existing container is an exec( ) system call.

* * * * *